Aug. 5, 1952     L. R. THOMAS ET AL     2,606,281
SYSTEM OF TRANSMITTING SIGNAL INDICATIONS FROM
RAILWAY SIGNALING DEVICES TO VEHICLES
AND FOR CONTROLLING SAME
Filed March 3, 1948     2 SHEETS—SHEET 2

INVENTORS:
Lilburn R. Thomas
and Charles A. Crouch
By George Heidinger Atty.

Patented Aug. 5, 1952

2,606,281

UNITED STATES PATENT OFFICE 2,606,281

SYSTEM OF TRANSMITTING SIGNAL INDICATIONS FROM RAILWAY SIGNALING DEVICES TO VEHICLES AND FOR CONTROLLING SAME

Lilburn R. Thomas, Wilmette, and Charles A. Crouch, Highland Park, Ill.

Application March 3, 1948, Serial No. 12,874

12 Claims. (Cl. 246—29)

Our invention relates more particularly to a method of transmitting signal indications from railway signalling devices arranged along the right-of-way to receiving means and associated equipment on vehicles adapted to travel along said right-of-way, such as railroad trains, trams and/or other suitable vehicle for guiding the operator of the vehicle at preselected points.

One object of our invention is the provision of a method of utilizing space radio, for transmitting signal indications from the stationary railway signalling devices to the vehicles whereby the crew on a vehicle approaching said signalling devices will be given an indication of the nature of the signal.

A further object of our invention is the provision of a method of utilizing radio transmitting means—of any suitable character—for transmitting the signal indications from the stationary railway signalling devices to the vehicle whereby the brakes of the vehicle will be operated at predetermined periods during undesired or improper movement of the vehicle.

Another object of our invention is the provision of an additional safety device, supplementing existing railway signalling devices, whereby it is impossible to pass the signalling devices without obtaining knowledge on the vehicle of the nature or indication of the signalling device.

A further object of the invention is the provision of a method whereby the crew on the approaching vehicle will be given a warning signal in the event the stationary signalling system fails to provide any signal to indicate that the signal system equipment is not functioning properly.

The aforementioned objects and advantages of our invention, as well as other advantages inherent in the invention, will be readily comprehended from the detailed description of the accompanying drawings wherein.

Figure 1:
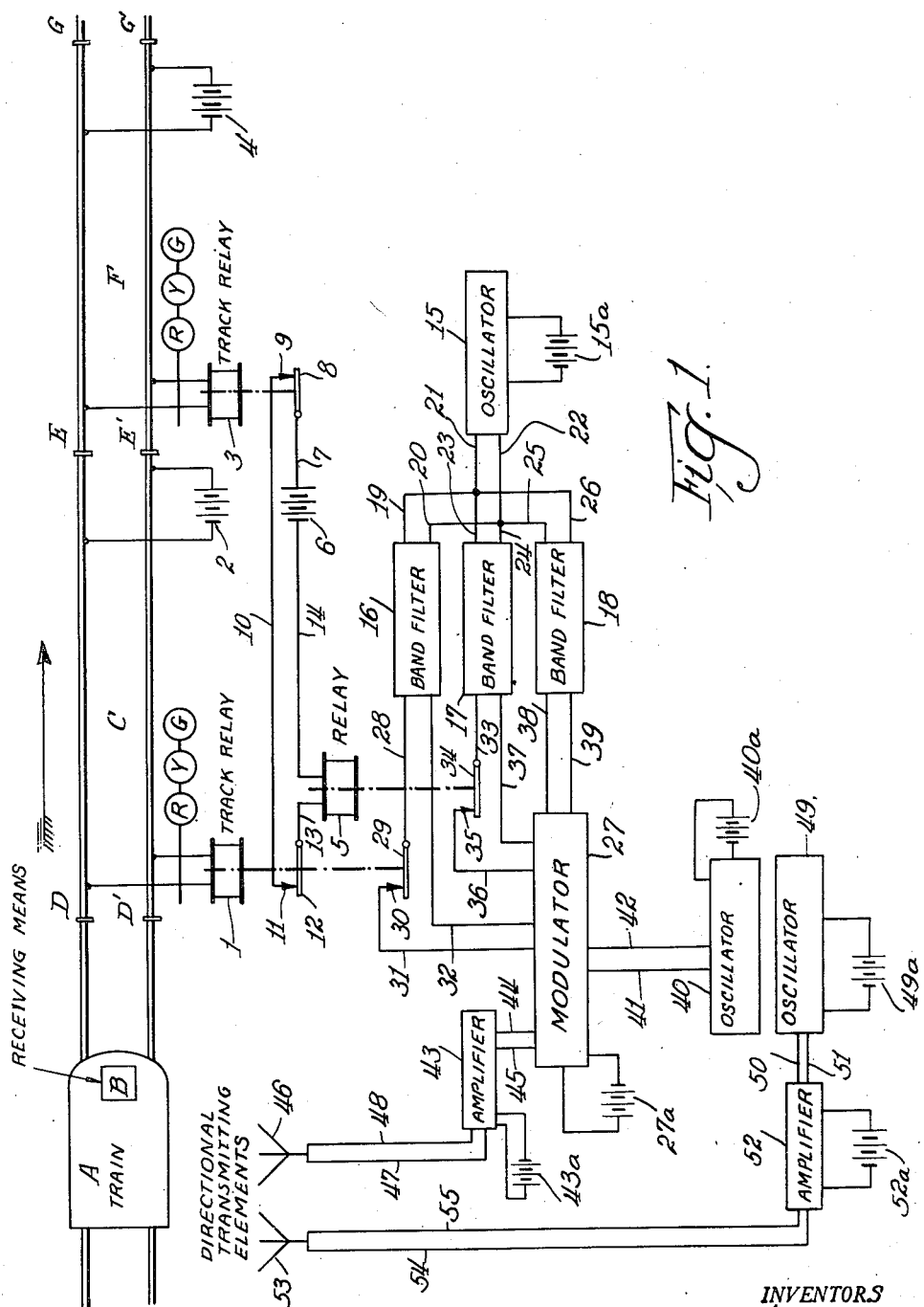
Figure 1 is a diagrammatic illustration of a typical railway track with signalling devices at preselected fixed locations and involving means for transmitting signal indications to the crew of the approaching vehicle on the track.

Figure 1 illustrates the equipment associated with one track circuit and the connecting circuits to interlock with the second track circuit. A indicates a vehicle or train approaching on the track in the direction of the arrow and provided with the receiving means generally indicated at B; the track consisting of the insulated section C, insulated at D, D' and E, E'; and insulated section F insulated at E, E' and G, G'.

The insulated track section C is shown provided with a track relay 1 and battery 2; while insulated track section F is shown provided with track relay 3 and battery 4.

Assuming there are no trains in the track sections C and F, in which case track relay 1 is held in the operated position by means of battery 2 and track relay 3 is held in the operated position by means of battery 4. A conventional relay 5 is held in its operated position by means of a battery 6 through wire 7, contacts 8 and 9 of relay 3, wire 10 contacts 11 and 12 of relay 1, wire 13 to relay 5, through the coils of relay 5 and wire 14 to battery 6. A low frequency oscillator is 15 with associated battery 15a; band filters being shown at 16, 17 and 18. With relays 1, 3 and 5 in their operated positions the signals from the low frequency oscillator 15 are transmitted to filters 16, 17 and 18 by means of wires 19, 20, 21, 22, 23, 24, 25 and 26. Filters 16, 17 and 18 are adapted to pass three separate frequencies on to a modulator 27 with associated battery 27a as follows: The signal from filter 16 passes through wire 28, contacts 29 and 30 of relay 1, wire 31 to modulator 27, returning to filter 16 on wire 32. The signal from filter 17 is transmitted by means of wire 33 to contacts 34 and 35 of relay 5, wire 36 to modulator 27, returning on wire 37 to filter 17. The signal from filter 18 is transmitted to modulator 27 by means of wires 38 and 39. The signal from filter 18 is transmitted continuously. A high frequency oscillator 40 with associated battery 40a provides the transmitted carrier to modulator 27 by means of wires 41 and 42.

Modulator 27 is a conventional modulator and the modulated high frequency carrier coming from the master high frequency oscillator 40 has the three low frequency signals superimposed on it by means of modulator 27 and the carrier is then transmitted to an amplifier 43 with associated battery 43a through wires 44 and 45 and from amplifier 43 to a directional antenna or suitable directional transmitting element 46 through wires 47 and 48.

One or more checking circuits may be provided as an additional safety feature. A signal is continuously transmitted from a safety high frequency oscillator 49 with associated battery 49a (which operates entirely independent of master source 40), through wires 50 and 51, through amplifier 52 with associated battery 52a to an antenna or suitable transmitting element 53 through wires 54 and 55. With the arrangement just described, the following signals are transmitted: The antenna or suitable transmitting element 46 transmits a high frequency carrier on which three low frequency signals are superimposed. A second signal transmitted by antenna or suitable transmitting element 53 consists of a high frequency carrier only. These transmitted signals will provide a green or clear indication on the train or vehicle A, later to be described.

If a train is in section F (insulated at points E and E' and G and G') relay 1 will be in its operated position by means of battery 2, while relay 3 will be in its non-operated or open position due to the train in track section F shorting battery 4 from the relay coils.

When relay 3 opens its contacts 8 and 9, battery 6 will be cut from relay 5, causing contacts 34 and 35 to be opened, thereby opening the output of filter 17 and cutting that frequency out of the modulated signal. Under this condition, the high frequency signal transmitted from source 40 will have only two frequencies superimposed thereon, namely from filter 16 and filter 18. The signal from source 49 will be transmitted continuously.

These transmitted signals will provide a yellow or caution indication on the train as well as a service application of the brakes of the train as hereinafter described.

If a train was in the insulated section C of the track (insulated at points D and D' and E and E') relay 1 would be in its non-operated or open position because battery 2 would be shunted from the relay coils by the train. Assuming there is no train in section F, then relay 3 would be in its operated position. With relay 1 in its non-operated position, its contacts 11 and 12 and 29 and 30 would be open; and with contacts 11 and 12 of relay 1 in open position, relay 5 would be opened which in turn would open its contacts 34 and 35, which would open the output of filter 17 thereby eliminating its output from the signal transmitted by directional element 46. Contacts 29 and 30 of relay 1 being open would eliminate the signal from filter 16. The transmitted signals from signal source 40 would have merely the low frequency signal of filter 18 superimposed on it and the transmitted source 49 would transmit a continuous signal as previously explained. These signals will provide a red or stop indication and an emergency brake application as hereinafter described.

It should be noted that transmitting elements 46 and 53 are directional and are so positioned that the receiving element on the train proceeding in the direction of the arrow in Figure 1 will pick up the signal before the train enters track section C but not after entering track section C. Direction transmitting elements 46 and 53 are also so positioned that trains operating in preceding or following track sections will not pick up the signal indication.

The elements hereinbefore described and all disclosed in Figure 1 constitute the signal transmitting means arranged at a fixed location or locations along the track. The elements and operation of the signal receiving equipment B arranged on the vehicle or train A, Figure 1, and as disclosed in Figure 2 will now be described.

The signal—or signals—transmitted by the transmitting means as disclosed in Figure 1 is received on an antenna or other suitable receiving element 56, arranged on the vehicle or train and passes over wires 57 and 58 to a high frequency amplifier 59 with associated battery 59a, thence through wires 60 and 61 to a demodulator 62 with associated battery 62a which separates the low frequency components from the high frequency signals. The low frequency components are then transmitted over wires 63 and 64 to an amplifier 65 with associated battery 65a. The low frequency signals pass from amplifier 65 over wires 66 and 67, to filter 72; wires 66 and 67, 70 and 71, and 73 and 74 to filter 75; wires 66 and 67, 70 and 71, 68 and 69, and 76 and 77 to a filter 78, and wires 66 and 67, 70 and 71, 68 and 69 and 79 and 80 to a filter 81. Filters 75, 78 and 81 pass the same frequencies as filters 16, 17 and 18 of the transmitting means in Figure 1, in numerical sequence into the following functions:

The frequency from filter 75 passes over wires 82 and 83 to a rectifier 84; from rectifier 84 over wires 85 and 86 to a relay 87. The frequency from filter 78 passes over wires 88 and 89 to a rectifier 90 and from rectifier 90 over wires 91 and 92 to a relay 93. The frequency from filter 81 passes over wires 94 and 95 to a rectifier 96 and over wires 97 and 98 to a relay 99.

A local oscillator 100 with associated battery 100a sends a signal into the RF amplifier 59 with associated battery 59a through wires 101 and 102. This signal passes through RF amplifier 59 over wires 60 and 61 to demodulator 62 with associated battery 62a over wires 63 and 64 to amplifier 65 over wires 66 and 67, 68 and 69, and 70 and 71 to filter 72 and from filter 72 over wires 103 and 104 to a rectifier 105, over wires 106 and 107 to a relay 108, holding it normally operated with its contacts 109 and 110 normally closed. With contacts 109 and 110 closed the circuit from battery 111 through wire 112, through lamp 113, through wire 114 tto contacts 110 and 109 and wire 115 stands closed, lighting the lamp.

In the event oscillator 100, RF amplifier 59, demodulator 62, amplifier 65, filter 72, rectifier 105, fail to function properly, relay 108 will become deenergized, thereby opening its contacts 109 and 110. Battery 111 will then extinguish lamp 113, showing that the circuit is inoperative.

Figure 2:
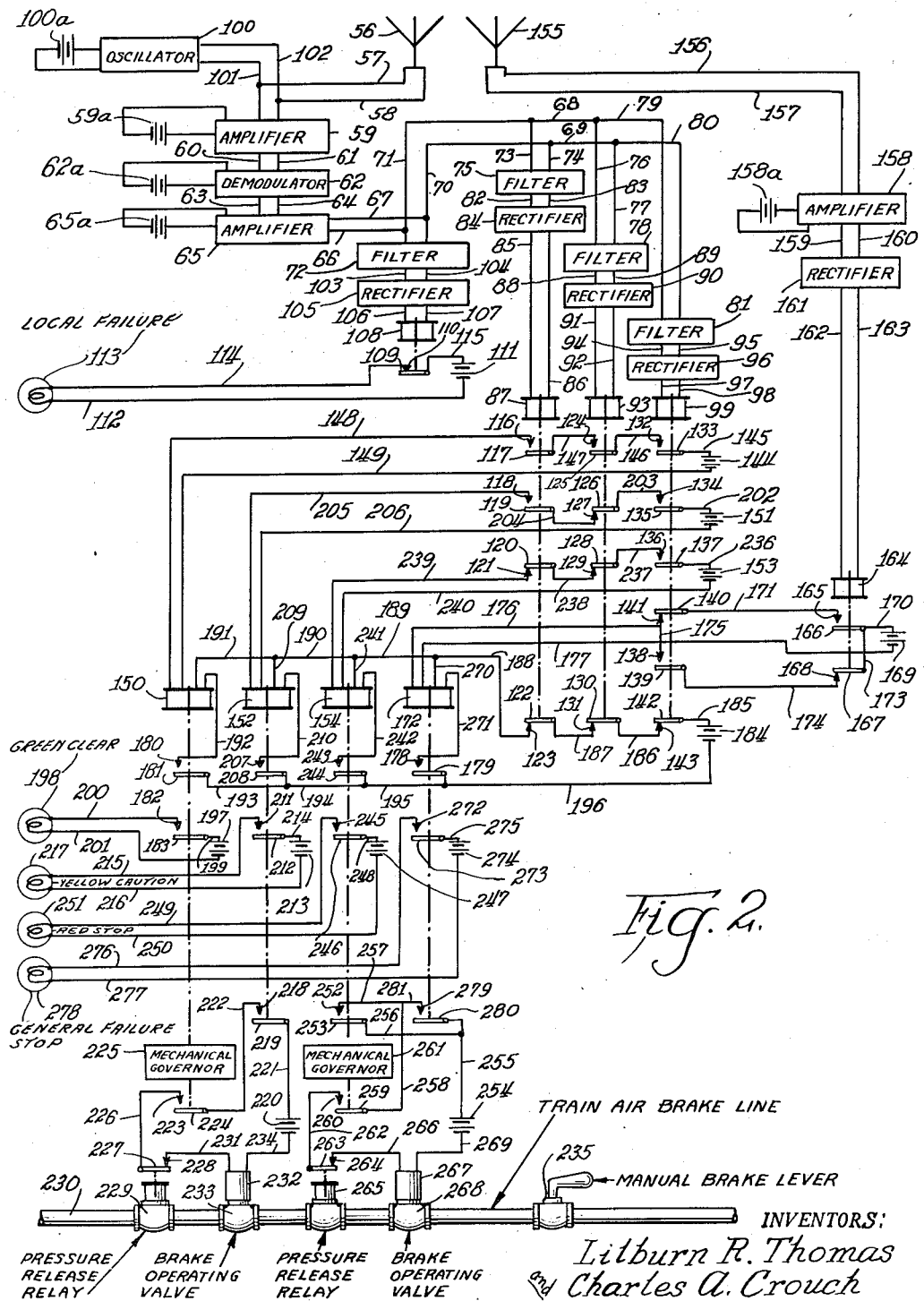
Figure 2 is a diagrammatic illustration of the signal receiving means and associated equipment on the vehicle.

On receipt of a clear or green signal from the transmitting means, Figure 1, consisting of three low frequency signals as passed by filters 16, 17 and 18 of Figure 1, the signals are picked up by the antenna or suitable receiving element 56, Figure 2, and passes through the components as previously described to operate relays 87, 93 and 99. Contacts 116 and 117, 118 and 119 of relay 87 are closed; contacts 120 and 121, 122 and 123 of relay 87 are open; contacts 124 and 125 of relay 93 are closed; contacts 126 and 127, 128 and 129, 130 and 131 of relay 93 are open; contacts 132 and 133, 134 and 135, 136 and 137, 138 and 139 of relay 99 are closed and contacts 140 and 141, 142 and 143 of relay 99 are open.

With relays 87, 93 and 99 in their operated positions, energy from battery 144 is applied through wire 145, contacts 132 and 133 of relay 99, wire 146, contacts 124 and 125 of relay 93, wire 147, contacts 116 and 117 of relay 87, wires 148 and 149 to one winding of relay 150. Due to contacts 126 and 127 of relay 93 being open, battery 151 cannot operate relay 152. As contacts 128 and 129 of relay 93 and contacts 120 and 121 of relay 87 are open, battery 153 cannot operate relay 154. At the same time this signal is being received, a second signal is being received on an antenna or other suitable receiving element 155 and transmitted through wires 156 and 157 to a high frequency amplifier 158 with associated battery 158a, thence through wires 159 and 160 to a rectifier 161 through wires 162 and 163 to a relay 164. This signal operates relay 164, closing contacts 165 and 166 of relay 164 and opens its contacts 167 and 168. With contacts 165 and 166 of relay 164 closed, energy is applied from battery 169 through wire 170, contacts 165 and 166 of relay 164, through wire 171 to contact 140 of relay 99. With contacts 140 and 141 of relay 99 standing open, the relay 172 cannot be closed. If a failure occurs and the signal is not received to operate relay 164, the energy is applied from battery 169 through wire 170 through wire 173 through contacts 167 and 168 of relay 164 through wire 174 through contacts 139 and 138 of relay 99 which are closed through wire 175 through wire 176 and 177 to one winding of relay 172, closing this relay which locks up through its contacts 178 and 179 when relays 87, 93 and 99 are in their non-operated positions. Relay 150 has been closed by the reception of three tone signals which operated relays 87, 93 and 99, closing the contacts 180 and 181, and 182 and 183 of relay 150.

Relay 150, being a slow-release type, will stay closed after the transmitted means have been passed which releases relays 87, 93 and 99 permits their respective contacts 122 and 123 of relay 87, contacts 130 and 131 of relay 93, and contacts 142 and 143 of relay 99 to close and connects battery 184 to the second winding of relay 150 through wire 185, relay contacts 142, and 143, wire 186, relay contacts 130 and 131, wire 187, relay contacts 122 and 123, wires 188, 189, 190 and 191 to the second coil of relay 150 through wire 192, contacts 180 and 181 of relay 150, wire 193, 194, 195 and 196 back to battery 184. This locks relay 150 in its closed or operated position until the next transmitting means is passed and a new signal is received.

Battery 197 operates green indication lamp 198 through wire 199, contacts 182 and 183 of relay 150 and wires 200 and 201. As previously outlined, the green lamp 198 will remain operated until a second signal is received operating relays 87, 93 and 99, opening their respective contacts 122 and 123, 130 and 131, and 142 and 143 releasing lock in circuit of relay 150 permitting it to return to an open or non-operative position.

When a signal is passed whose transmitting means is transmitting a yellow or caution indication consisting of low frequency signals passed through filters 16 and 18 of transmitting means Figure 1, these signals are received as heretofore outlined through filters 75 and 81, rectifiers 84 and 96, operating relays 87 and 99. Relay 87 in its operated position closes its contacts 116 and 117, 118 and 119 opens its contacts 120 and 121, 122 and 123. Relay 93 in its non-operated position opens contacts 124 and 125 and closes contacts 126 and 127, 128 and 129 and 130 and 131. Relay 99 in its operated position closes its contacts 132 and 133, 134 and 135, 136 and 137, and 138 and 139 and opens its contacts 140 and 141, 142 and 143. With the relays in this condition, battery 151 is applied to relay 152 through wire 202, contacts 134 and 135 of relay 99, wire 203, contacts 126, and 127 of relay 93, wire 204, contacts 118 and 119 of relay 87, and wires 205 and 206 to one winding of relay 152. Relays 150, 154 and 172 are in their non-operated or open position because relay 93 is non-operated, opening its contacts 124, and 125, removing battery 144 from relay 150; relay 87 is operated, opening its contacts 120 and 121, removing battery 153 from relay 154, while relay 172 is non-operated because relay 164 is operated, opening its contacts 167 and 168. Relay 99 is operated, opening its contacts 140 and 141, and removing battery 169.

Relay 152, being a slow-release relay, is locked in the operated position through its contacts 207 and 208 after transmitting means as outlined in Figure 1 has been passed. This locking is accomplished from battery 184 through wire 185, contacts 142 and 143 of relay 99, wire 186, contacts 130 and 131 of relay 93, wire 187, contacts 122 and 123 of relay 87, wires 188, 189, 190 and 209 to relay 152, wire 210, contacts 207 and 208 of relay 152 and wires 194, 195 and 196. Contacts 211 and 212 of relay 152 are closed thereby applying battery 213 through wire 214 and contacts 211 and 212 through wires 215 and 216 to a caution or yellow lamp 217.

The operation of relay 152 also closes its contacts 218 and 219 which connect battery 220 through wires 221 and 222 through contacts 223 and 224 of a governor 225 which will be closed, if a train is proceeding in excess of a predetermined speed, through wires 226 and contacts 227 and 228 of an air reduction release relay 229 in the train line 230 through wire 231 to slowly operate air valve control 232 and automatic brake-operating valve 233, wire 234 to battery 220. The yellow or caution lamp 217 will remain lighted until the next transmitted means is passed and a new signal indication is given. As long as relay 152 is locked up and its contacts 218 and 219 are closed and mechanical governor 225, which is mechanically connected to the wheels or other moving parts of the locomotive, is operated and its contacts 223 and 224 are closed, the train is operating in excess of the previously determined speed. If the manual brake valve 235 is not operated to reduce the pressure in the train line 230 to a point where pressure release relay 229 will open, to thereby open its contacts 227 and 228, a service application of the brakes will be made by automatic brake operating valve 233 in conjunction with slow-operating air valve control 232. If manual brake valve 235 is operated, reducing the train speed, governor 225 opens its contacts 223 and 224. If manual brake valve 235 is not operated, a service application of brakes will be made by means of the automatic brake-operating valve 233 in conjunction with slow-operating air valve control 232, reducing the train speed until governor 225 releases, thereby opening its contacts 223 and 224. No further reduction will be made during the period relay 152 is closed and the yellow or caution lamp is lighted. When the next signal is received and relays 87, 93 and 99 operate, the locking circuit on relay 152 will be opened through their respective contacts 122 and 123, 130 and 131, or 142 and 143, thereby restoring relays 150, 152, 154 and 172 to their non-operated positions for the next signal selection.

If a transmitting means, as described in Figure 1, is transmitting a red signal, consisting only of the signal transmitted through filter 18, is received by receiving element 56, Figure 2, passing through the receiving means to filter 81 and rectifier 96 to operate relay 99, with relays 87 and 93 in their non-operated position, then contacts 116 and 117, and 118 and 119 of relay 87 will be open; contacts 120 and 121, and 122 and 123 of relay 87 will be closed; contacts 124 and 125 of relay 93 will be open; contacts 126 and 127, 128 and 129, and 130 and 131 of relay 93 will be closed; contacts 132 and 133, 134 and 135, 136 and 137, and 138 and 139 of relay 99 will be closed; contacts 140 and 141, and 142 and 143 of relay 99 will be open. In this condition, battery energy is applied to relay 154 by battery 153 through wire 236, contacts 136 and 137 of relay 99, wire 237, contacts 128 and 129 of relay 93, wire 238, contacts 120 and 121 of relay 87, wires 239 and 240 to one winding of relay 154. Relay 154 being a slow-release relay, will be locked in its operated position after relays 87, 93 and 99 have returned to normal or non-operated positions by means of battery 184 applied to the second winding of relay 154 through wire 185, contacts 142 and 143 of relay 99, wire 186, contacts 130 and 131 of relay 87, wires 188, 189 and 241, second winding of relay 154, wire 242, contacts 243 and 244 of relay 154, wires 195 and 196 returned to battery 184. Contacts 245 and 246 of relay 154 are closed, thereby applying energy from battery 247 to wire 248, contacts 245 and 246 of relay 154, wires 249 and 250 to red or stop lamp 251. With relay 154 closed, its contacts 252 and 253 are closed, thereby applying energy from battery 254 through wires 255 and 256, contacts 253 and 252 of relay 154, wires 257 and 258, contacts 259 and 260 of mechanical governor 261 which will be closed if the train is exceeding a predetermined speed. Wire 262 to contacts 263 and 264 of pressure release relay 265 through wire 266 to slow-operating air valve control 267, whose operation is set to a predetermined time interval, associates automatic brake-operating valve 268, wire 269 to battery 254. On receiving a stop signal, if the train is brought to a stop or a predetermined brake reduction is made by means of manual valve 235, thereby opening the contacts 259 and 260 of governor 261, no brake application will be made by automatic brake-operating valve 268.

As previously described, if the signal is not received on receiving means 155 and a signal is received on receiving element 56, relay 172 will close, and, being a slow-release relay, will lock up through contacts 142 and 143 of relay 99, 130 and 131 of relay 93, and 122 and 123 of relay 87, wires 188, 270, second winding of relay 172, wire 271, contact 178 and 179 of relay 172, wire 196 to battery 184 and wire 185. When relay 172 closes, it closes its contacts 272 and 273 which apply energy from battery 274, wire 275 through contacts 272 and 273 of relay 172, wires 276 and 277 and lamp 278, thus indicating that it is not functioning properly. When relay 172 is in its operated position, contacts 279 and 280 are closed or operated, thereby applying energy from battery 254, through wire 255, contacts 279 and 280 of relay 172, wires 281 and 258 through contacts 259 and 260 of governor 261 to wire 262 to contacts 263 and 264 of pressure release relay 265 to wire 266 to slow-operate air valve control 267 and associated automatic brake-operating valve 268 and wire 269. The operation of the manual or automatic brake application is the same as that for red signal.

If relay 99 fails to operate due to failure either of the transmitting means or the receiving circuit and a signal is received on receiving element 155, closing or operating relay 164, energy will be applied to relay 172 from battery 169 through wire 170, contacts 165 and 166 of relay 164, wire 171, contacts 140 and 141 of relay 99, wire 176 and 177. In this event, the alarm and brake-operating circuit will be set up in the same manner as described above.

Our invention, which is employed in conjunction with the standard signalling equipment at present in use, is intended to give signal indications to the train crew of the signals provided by said equipment; the invention being based on a safety factor involving the condition that the clear signal produced in our system depends on the transmission of three low frequency signals; namely in the event any of those signals are not present a restricted (yellow) or a stop (red) indication will be given. Or if all three low frequency signals are not transmitted a warning signal will be given indicating improper functioning of the equipment. The reception of signals on the receiving means on the vehicle depends on two separate signals being transmitted from the transmitting means, so that in the event of failure of either one of these signals a restricted indication will be given on the vehicle, indicating that the equipment is not functioning properly. If the vehicle passes the track signal and the next signal indications are normal it will indicate that the trouble is confined to the signal or the transmitting means just passed.

Our improved system involves an additional checking device of a continuously transmitted signal which must be present at the receiving means to provide proper operation of the receiving equipment. This checking device or signal is transmitted from a separate source with a separate transmitting element and received by a separate receiving element and receiving equipment and relay interlocked with the intelligence receiving unit, so that in the event this signal or all of the intelligence signals are not received an alarm is provided indicating to the engineer that a failure has occurred thereby permitting him to take maximum precaution for the safety of his train.

In addition to the warning signal produced on the vehicle, our invention involves a further safety factor by providing brake applications if the vehicle operator fails to make proper brake applications in a predetermined time interval after receiving a caution (yellow) or stop (red) signal indication.

The reception of the signal indication from the signal passed on the track is "locked up" by the associated relay circuits in the receiving means until the next signal of the railway signalling equipment is received to re-set the receiving equipment or means through the transmitting and associated receiving means.

In our improved system the signal is transmitted by a fixed antenna and the intelligence is superimposed on that signal by relay control channels, thereby eliminating the necessity for semaphores and positioning antennas, thus permitting operation with present day type of railway signal systems.

The described exemplification of our improved system is believed to be the best embodiment of the invention but certain modifications may be possible without departing from the spirit of our invention as defined in the appended claims.

What we claim is:

1. In a system of signal indication transmission and vehicle control, the combination of the relay operated track circuits of standard railway signalling equipment; a transmitting means comprising a relay containing control circuit arranged to be controlled by the relays of adjacent track circuits of the standard railway signalling equipment; an oscillator providing a plurality of separate frequency conveying channels one of which is to be controlled by a track circuit relay, a second channel to be controlled by a relay of said control circuit, while a third is a continuously closed or continuously transmitting channel; a high frequency oscillator, modulator and amplifier; a fixed directional transmitting means whose radiation is independent of the rails of the track; and an independent checking circuit consisting of a continuously transmitting high frequency oscillator and a second fixed directional transmitting means whose radiation is independent of the rails of the track and whose signal must be present in the receiving means on the vehicle to provide for its proper operation.

2. In a system of railroad track signal indication transmission and vehicle control, receiving means on the track vehicle comprising a pair of receiving elements which function independent of the rails of the track, one of said receiving elements having a circuit involving a high frequency amplifier, a demodulator for the output of said amplifier; a plurality of separate low frequency channels, each channel involving separate relays and separate light indication means and sources of electrical energy; the lamp of one of said channels becoming extinguished when the receiver becomes inoperative, while the other channels separately provide either a clear or green light indication—a yellow or caution light indication—or a stop or red light indication when signals are received by said last mentioned receiving element; a checking channel involving the other of said pair of receiving elements, a high frequency amplifier, a relay controlled circuit, a lamp and electrical energy source whereby said lamp becomes lighted in the event of failure of said first mentioned receiving element to receive signals; in combination with the valve controlled train air line, a pair of governors for separately controlling the train line valves, one of said governors being operated with the yellow or caution light indication channel whereby said governor and train line valve will operate and a service or light vehicle brake application made if the train is travelling in excess of a predetermined speed while the second governor which operates with the stop or red light indication channel and with a train line valve whereby the latter is actuated to provide an emergency or stop brake application.

3. A signal indication transmission system comprising, in combination with a standard railroad track block signal system provided with electrically operated relays; a control circuit controlled by the track signal system relays; signal indication transmitting means having a plurality of individual frequency channels and a pair of transmitting elements whose radiation is independent of the rails of the track, one of said channels being controlled by a track signal system relay and one of said channels being controlled by said control circuit; means whereby one or all of the signals from three of said channels are transmitted by one of the transmitting elements; means whereby the independent checking signal from the fourth channel is continuously transmitted by the other of said transmitting elements; receiving means arranged on the track vehicle comprising a pair of receiving elements which function independent of the rails of the track, a plurality of individual frequency channels, a plurality of signal indication lamps, relay controlled circuits intermediate the channels and said lamps; a pair of normally open circuits involving means to actuate valves in the air brake train line of the vehicle on said track adjacent said signal system and controlled by certain of said last mentioned relay controlled circuits whereby a service brake application is obtained upon closure of one of said pair of open circuits when one of said channels provides a caution signal indication and an emergency brake application obtained upon closure of the other of said pair of open circuits upon receipt by one of said channels of a stop signal indication or failure to receive the independently transmitted check signal in the event of failure by the vehicle operator to make brake applications within predetermined time intervals.

4. In a signal indication system, operative in conjunction with a standard railroad track electric signal system; receiving means arranged on the railroad vehicle comprising a pair of receiving elements which function independent of the rails of the track; a plurality of individual frequency channels receiving signals from one of said receiving elements; a plurality of lamp controlling circuits connected to the outputs of said frequency channels, one of said last mentioned circuits being operated in conjunction with the other of said pair of receiving elements; a vehicle air brake train line provided with relay controlled pressure release valves; a pair of normally open circuits each involving a governor and valve operating relays, said circuits being operatively intermediate certain of the frequency channels and the pressure release valve relays whereby service brake application is provided; and a normally open circuit operative with the other of said pair of receiving elements and having valve control relay mechanism whereby an emergency brake application is provided after a predetermined time interval, both of said brake applications being made in the event of failure of manual brake operation.

5. In a signal indication and railroad vehicle control system, receiving means arranged on the railroad vehicle comprising a pair of signal receiving elements which function independent of the rails of the track, a plurality of low frequency channels receiving signals from one of said receiving elements, each channel involving relay controlled lamp circuits to provide clear, caution and stop signals; the other of said pair of receiving elements which constantly receive a high frequency or carrier wave and is connected to a relay controlling circuit, in combination with an air brake train line pressure valve controlling circuit which becomes effective through said carrier wave and upon reception of signals by said first mentioned receiving element and failure to receive a signal on the other receiving element whereby the air brake train line pressure valve is actuated and the vehicle brake application produced.

6. In a signal indication and railroad vehicle control system, the combination of an air brake train line provided with a slow valve control and a brake operating relay; receiving means arranged on the railroad vehicle comprising a pair of signal receiving elements which function independent of the rails of the track, a plurality of low frequency channels receiving signals from the receiving element, each channel comprising relay controlled lamp circuits to provide clear, caution or stop signals and an alarm lamp containing circuit operatively associated with one of said pair of signal receiving elements whereby failure of said last mentioned signal receiving element to receive a signal during reception of a signal by the other of said receiving elements said alarm lamp will become lighted and said slow valve control and brake operating relay will be actuated to provide an emergency brake application in a predetermined time interval unless the engineer has responded to said alarm signal.

7. In a signal indication and railroad vehicle control system, receiving means arranged on the railroad vehicle consisting of a pair of signal receiving elements which function independent of the rails of the track; a plurality of low frequency channels receiving signals from one of said receiving elements, said channels having relay controlled lamp circuits to provide clear, caution and stop signals; the other of said pair of receiving elements constantly receiving a high frequency or carrier wave and connected to a relay controlling circuit; in combination with an air brake train line having a pressure controlling valve, and a relay containing circuit operatively intermediate said last mentioned relay controlling circuit and said pressure controlling valve whereby the latter is actuated to provide a brake application in the event a signal is received by said last mentioned receiving element and no signal is received by said first mentioned receiving element.

8. A signal indication and railroad vehicle control system comprising, in combination with the relay operated track circuits of standard railway signalling equipment; of transmitting means consisting of a relay containing control circuit to be controlled by relays of the adjacent track circuits, a low frequency oscillator and a plurality of separate low frequency conveying channels one of which is to be controlled by a track circuit relay, a second channel to be controlled by a relay of said control circuit while the third is a continuously closed or transmitting channel, a modulator and a high frequency source and a directional transmitting means whose radiation is independent of the rails of the track, a receiving means arranged on the vehicle and signal receiving elements which function independent of the rails of the track, a plurality of relay containing low frequency channels receiving signals from one of said signal receiving elements, all of said channels consisting of relay controlled lamp circuits for providing a clear or green signal upon reception from three of the low frequency channels of the transmitting means, a caution or yellow signal upon reception of the low frequency signals from two of the low frequency channels of the transmitting means, while a red or stop signal on the receiving means is dependent on the reception of a signal from one low frequency channel of said transmitting means whereby in the event of failure in one of the channels of the transmitting means a restrictive indication in the receiving means is always received.

9. In a signal indication and railroad vehicle control system, transmitting means operated by a pair of interlocked relay operated track circuits of a standard railway signalling equipment, said transmitting means comprising a relay containing control circuit controlled by the relays of said adjacent pair of track circuits, a low frequency oscillator with a plurality of separate frequency conveying channels each consisting of a band filter, one of the channels being controlled by a track circuit relay, a second channel being controlled by the relay of said control circuit, while a third constitutes a continuously transmitting channel, a modulator and high frequency oscillator connected to said modulator, amplifying means, a fixed directional transmitting element whose radiation is independent of the rails of the track associated with the output of said modulator, a high frequency oscillator, amplifying means and a second fixed directional transmitting element whose radiation is independent of the rails of the track which continuously transmits a signal; the signals of said continuously transmitting channel and said high frequency oscillator provide a red or stop indication and effect an emergency brake application.

10. In a signal indication and railroad vehicle control system, signal receiving means arranged on the vehicle comprising signal receiving elements, which function independent of the rails of the track, high frequency amplifiers connected to said elements, a demodulator and amplifier, a plurality of low frequency channels operated by said last mentioned amplifier and each consisting of relays and light signal providing circuits, a circuit checking local oscillator for feeding a continuous signal into the receiving means, one of said channels controlling a normally closed lamp circuit, whereby failure in the receiving means will be indicated by the lamp of said normally closed circuit.

11. In a signal indication and railroad vehicle control system, signal receiving means arranged on the vehicle comprising, in combination with an air brake train line provided with an automatic brake operating valve and a normally open circuit connected to the valve, a pair of receiving elements which function independent of the rails of the track one of which receives a plurality of low frequency channels and relay controlled clear, caution and stop light indicating circuits, the other of said pair of receiving elements constantly receives a high frequency or carrier wave and is connected to a high frequency amplifier, rectifying means and a relay controlled circuit, and a normally open circuit consisting of a slow or time interval control element and said automatic brake line valve, whereby the high frequency wave received by the last mentioned receiving element and failure of reception of a signal by said first mentioned receiving element will close said last mentioned normally open circuit and effect brake application.

12. In a signal indication and railroad vehicle control system, signal receiving means arranged on the vehicle comprising a pair of signal receiving elements which function independent of the rails of the track, a continuous signal providing oscillator, a high frequency amplifier, a demodulator, a low frequency amplifier and a plurality of channels all associated with one of said receiving elements; the signals received by certain of said channels being adapted to control clear, caution and stop light providing circuits, while the signal from the aforementioned oscillator controls a normally closed alarm signal circuit operative in event of failure in the receiving means; a high frequency amplifier, rectifier and a relay connected to the other of said pair of signal receiving elements; a relay circuit controllable by said first mentioned relay and an open lamp circuit controlled by said last mentioned relay whereby said open circuit will be closed and a signal provided by its lamp in the event of signal reception by the first mentioned receiving element and signal reception failure by the second mentioned receiving element.

LILBURN R. THOMAS.
CHARLES A. CROUCH.

REFERENCES CITED

The following references are of record in the file of this patent:

UNITED STATES PATENTS

| Number | Name | Date |
|---|---|---|
| 1,816,628 | Williams et al. | July 28, 1931 |
| 1,882,027 | Nicholson | Oct. 11, 1932 |